Figure 3:
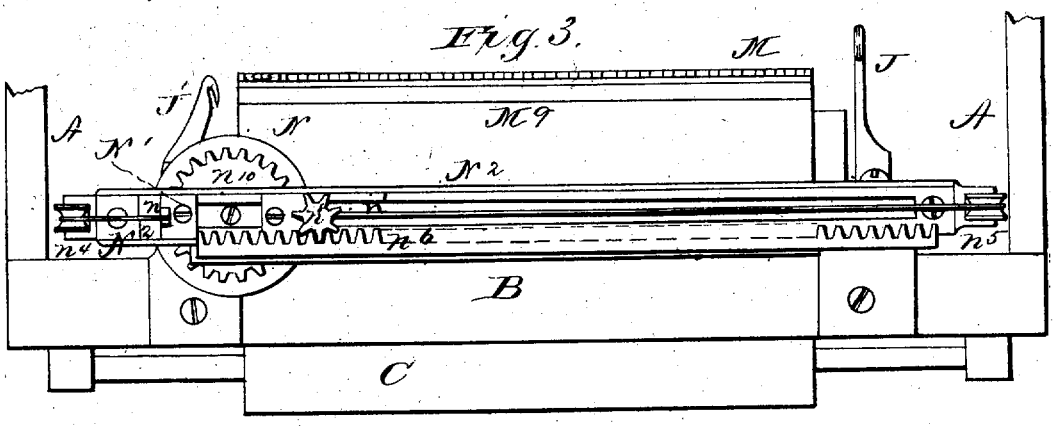

13 Sheets—Sheet 1.

A. SMITH, dec'd., & H. SKINNER,

W. B. SMITH & W. F. COCHRAN, executors of A. SMITH, assignors, by mesne assignments, to said W. B. SMITH, W. F. COCHRAN & E. S. COCHRAN.

Loom.

No. 9,694. Reissued May 3, 1881.

Witnesses:
F. L. Ouraud
H. L. Benneu.

Inventors
W. B. Smith
W. F. Cochran
Executors of Abr. Smith.
Halcyon Skinner
by their atty
E. S. Renwick 13 Sheets—Sheet 2.
A. SMITH, dec'd., & H. SKINNER,
W. B. SMITH & W. F. COCHRAN, executors of A. SMITH, assignors, by mesne assignments, to said W. B. SMITH, W. F. COCHRAN & E. S. COCHRAN.
Loom.
No. 9,694. Reissued May 3, 1881.
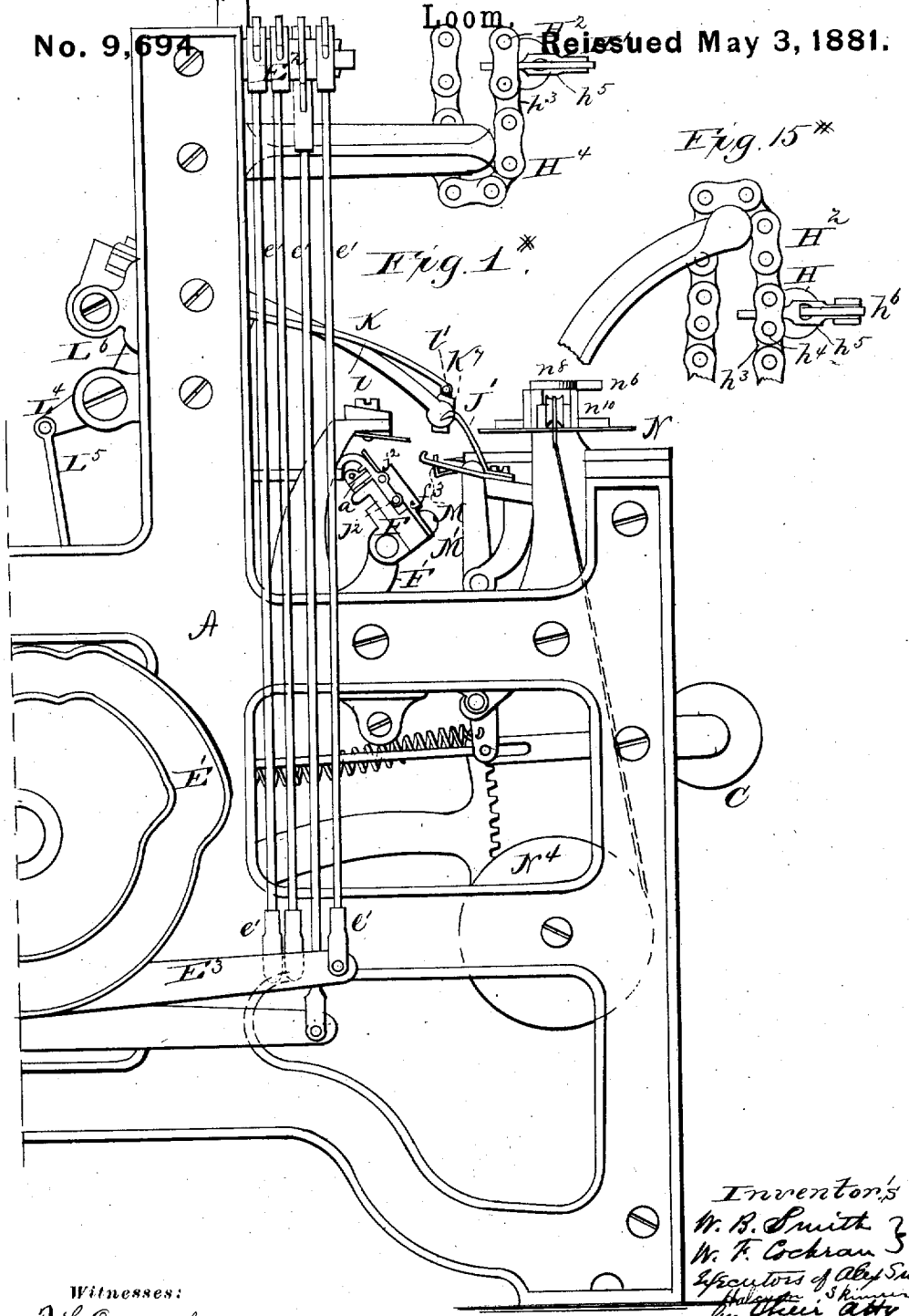
Witnesses:
A. L. Durand
W. L. Bennett.
Inventors
W. B. Smith
W. F. Cochran
Executors of A. Smith
Assignors
by their Atty
E. S. Renwick

A. SMITH, dec'd., & H. SKINNER,
W. B. SMITH & W. F. COCHRAN, executors of A. SMITH, assignors, by mesne assignments, to said W. B. SMITH, W. F. COCHRAN & E. S. COCHRAN.
Loom.
No. 9,694. Reissued May 3, 1881.
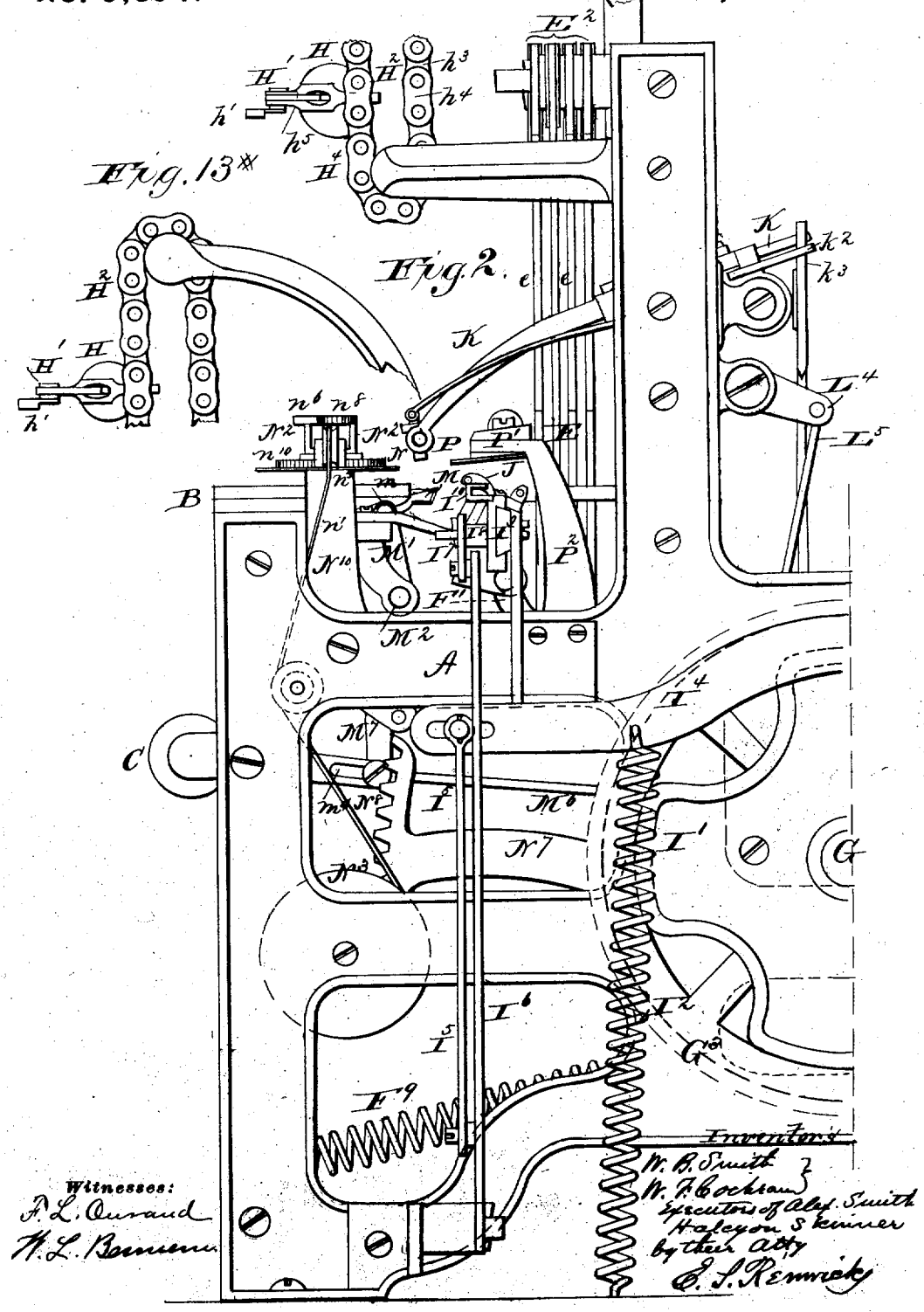

13 Sheets—Sheet 4.

A. SMITH, dec'd., & H. SKINNER,

W. B. SMITH & W. F. COCHRAN, executors of A. SMITH, assignors, by mesne assignments, to said W. B. SMITH, W. F. COCHRAN & E. S. COCHRAN.

Loom.

No. 9,694. Reissued May 3, 1881.

Witnesses:
F. L. Durand
H. L. Benneen.

Inventors
W. B. Smith } Executors of
W. F. Cochran } Aug. Smith
Halcyon Skinner
by their Atty
E. S. Renwick 13 Sheets—Sheet 5.
A. SMITH, dec'd., & H. SKINNER,
W. B. SMITH & W. F. COCHRAN, executors of A. SMITH, assignors, by mesne assignments, to said W. B. SMITH, W. F. COCHRAN & E. S. COCHRAN.
Loom.
No. 9,694. Reissued May 3, 1881.
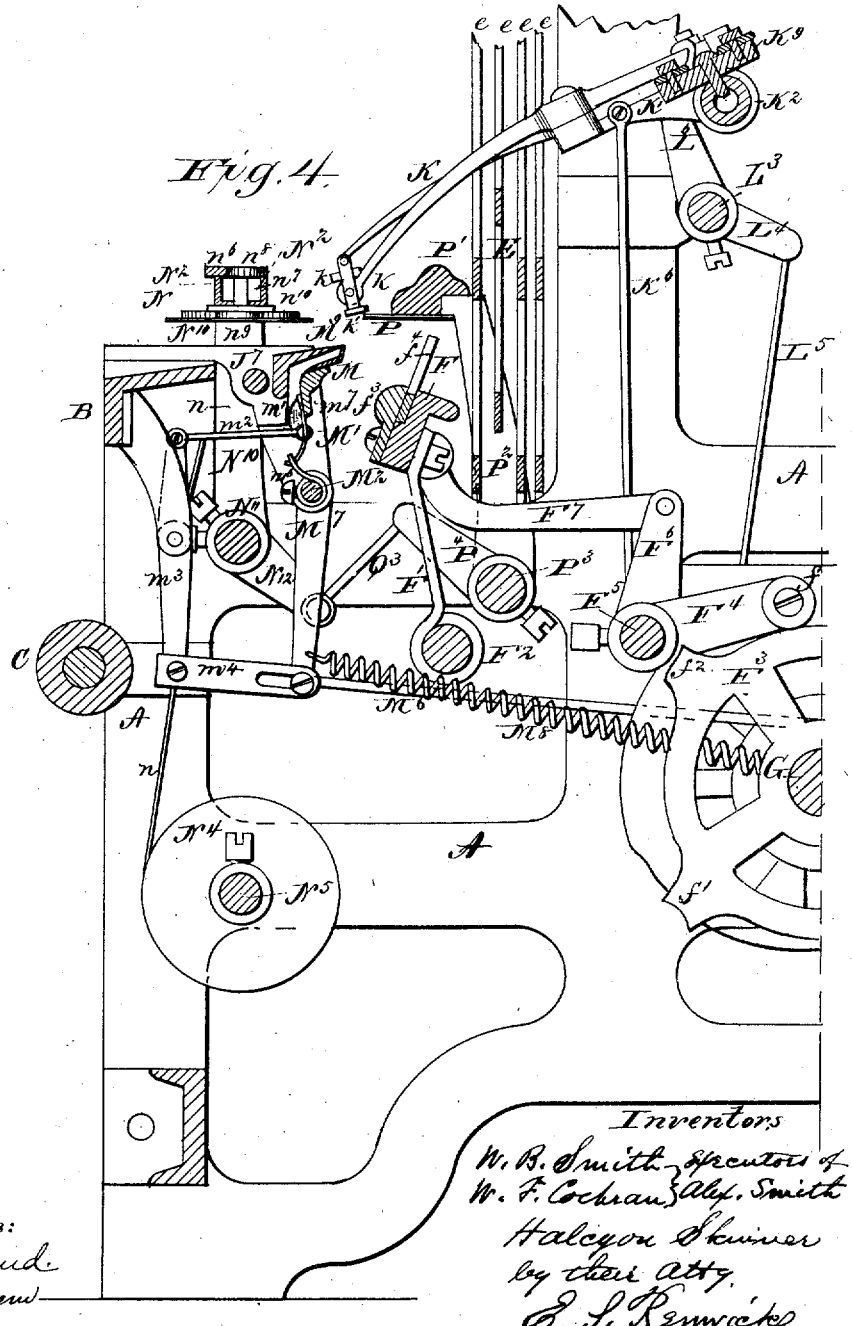
Witnesses:
F. L. Ouvard
H. L. Bennew
Inventors
W. B. Smith, Executors of
W. F. Cochran, A. Smith
Halcyon Skinner
by their Atty.
E. S. Renwick 13 Sheets—Sheet 6.

A. SMITH, dec'd., & H. SKINNER,

W. B. SMITH & W. F. COCHRAN, executors of A. SMITH, assignors, by mesne assignments, to said W. B. SMITH, W. F. COCHRAN & E. S. COCHRAN.

Loom.

No. 9,694. Reissued May 3, 1881.

Inventors.
W. B. Smith
W. F. Cochran
Executors of
Alex. Smith.
Halcyon Skinner
by their Atty.
E. S. Renwick Witnesses:
D. L. Durand
H. L. Bennett A. SMITH, dec'd., & H. SKINNER, W. B. SMITH & W. F. COCHRAN, executors of A. SMITH, assignors, by mesne assignments, to said W. B. SMITH, W. F. COCHRAN & E. S. COCHRAN.

Loom.

No. 9,694. Reissued May 3, 1881.

Witnesses:
F. L. Ouraud
H. L. Benneu.

Inventors
W. B. Smith
W. F. Cochran
Executors of Alex. Smith.
Halcyon Skinner
by their Atty
E. S. Renwick

A. SMITH, dec'd., & H. SKINNER,
W. B. SMITH & W. F. COCHRAN, executors of A. SMITH, assignors, by mesne assignments, to said W. B. SMITH, W. F. COCHRAN & E. S. COCHRAN.
Loom.
No. 9,694. Reissued May 3, 1881.
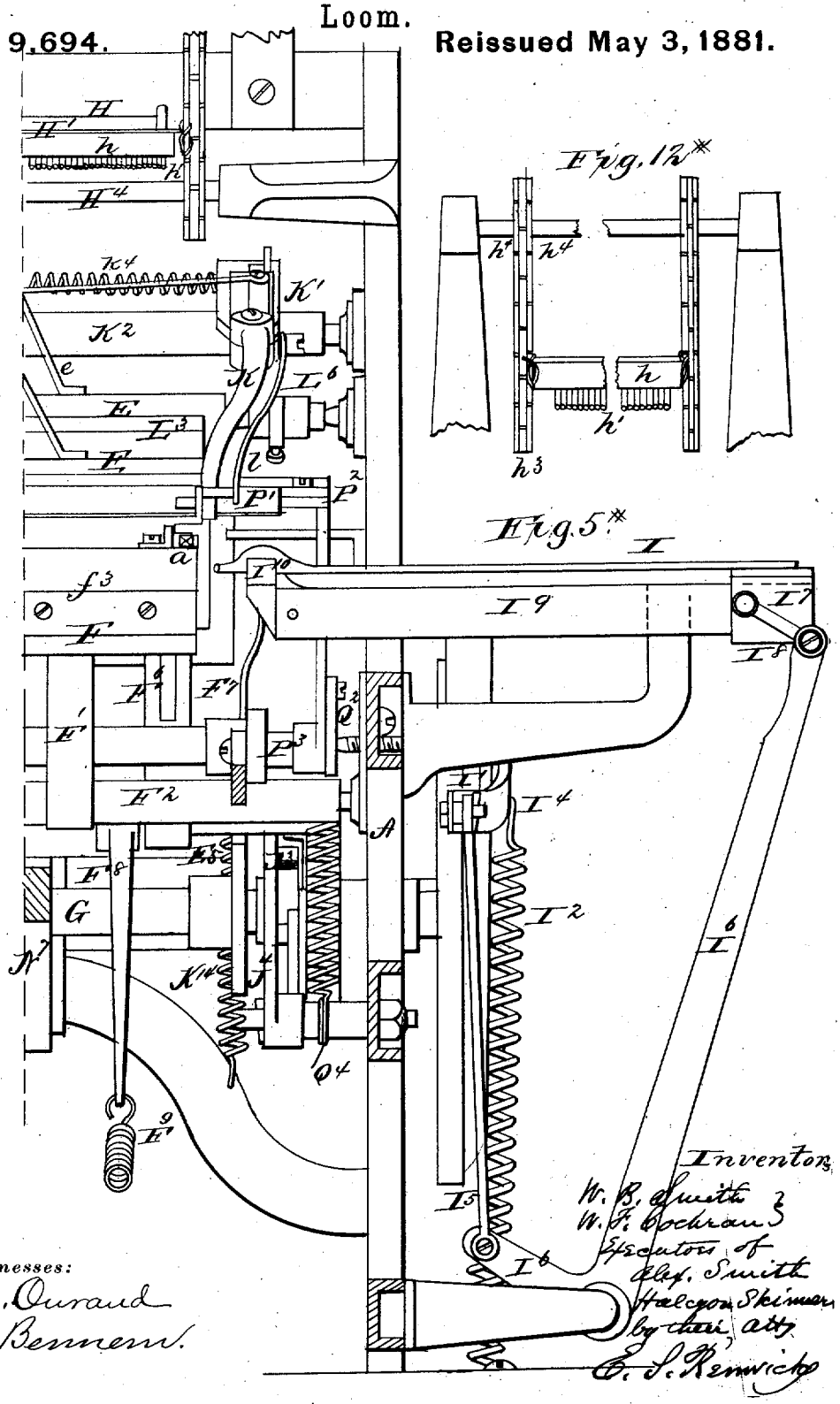
Witnesses:
A. L. Duraud
W. L. Bennett

A. SMITH, dec'd., & H. SKINNER,
W. B. SMITH & W. F. COCHRAN, executors of A. SMITH, assignors, by mesne assignments, to said W. B. SMITH, W. F. COCHRAN & E. S. COCHRAN.
Loom.
No. 9,694. Reissued May 3, 1881.
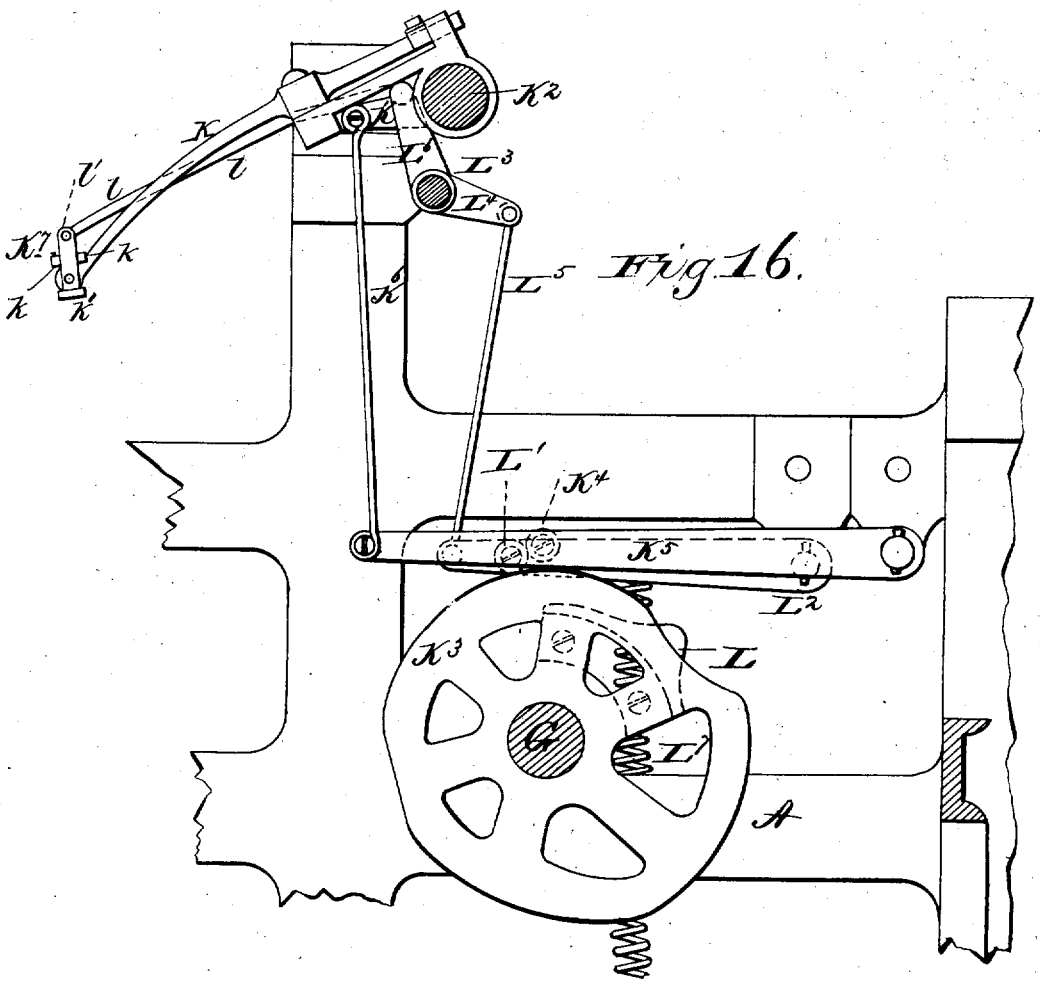
Witnesses:
Franck L. Durand.
H. L. Bennett.
Inventors
W. B. Smith } Executors of
W. F. Cochran } A. Smith
Halcyon Skinner
by their Atty.
E. S. Renwick

A. SMITH, dec'd., & H. SKINNER,
W. B. SMITH & W. F. COCHRAN, executors of A. SMITH, assignors, by mesne assignments, to said W. B. SMITH, W. F. COCHRAN & E. S. COCHRAN.
Loom.
No. 9,694. Reissued May 3, 1881.
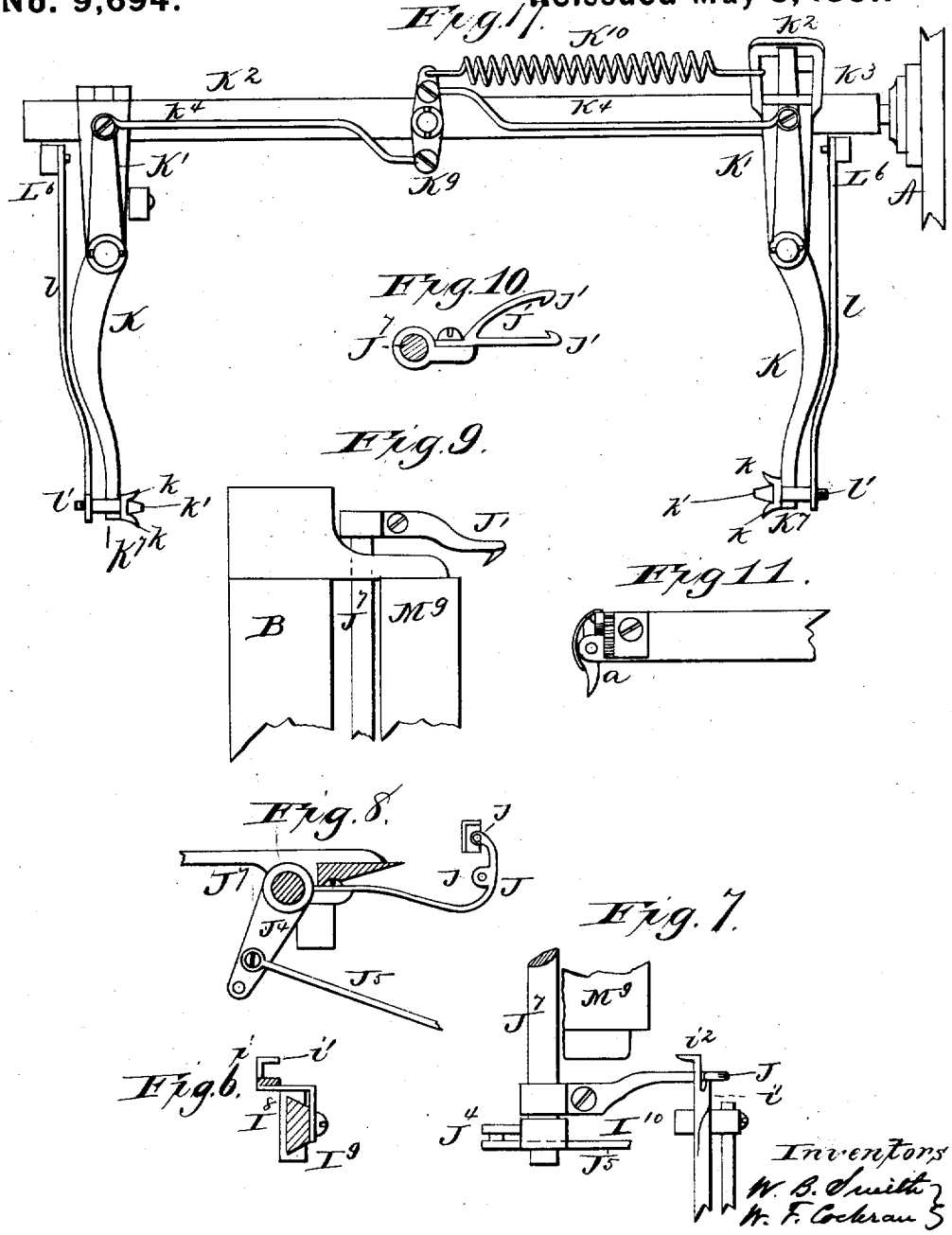
Witnesses:
F. L. Durand
W. L. Bennett
Inventors
W. B. Smith
W. F. Cochran
Executors of A. Smith
Halcyon Skinner
by their Atty.
E. S. Renwick

A. SMITH, dec'd., & H. SKINNER,
W. B. SMITH & W. F. COCHRAN, executors of A. SMITH, assignors, by mesne assignments, to said W. B. SMITH, W. F. COCHRAN & E. S. COCHRAN.
Loom.
No. 9,694. Reissued May 3, 1881.
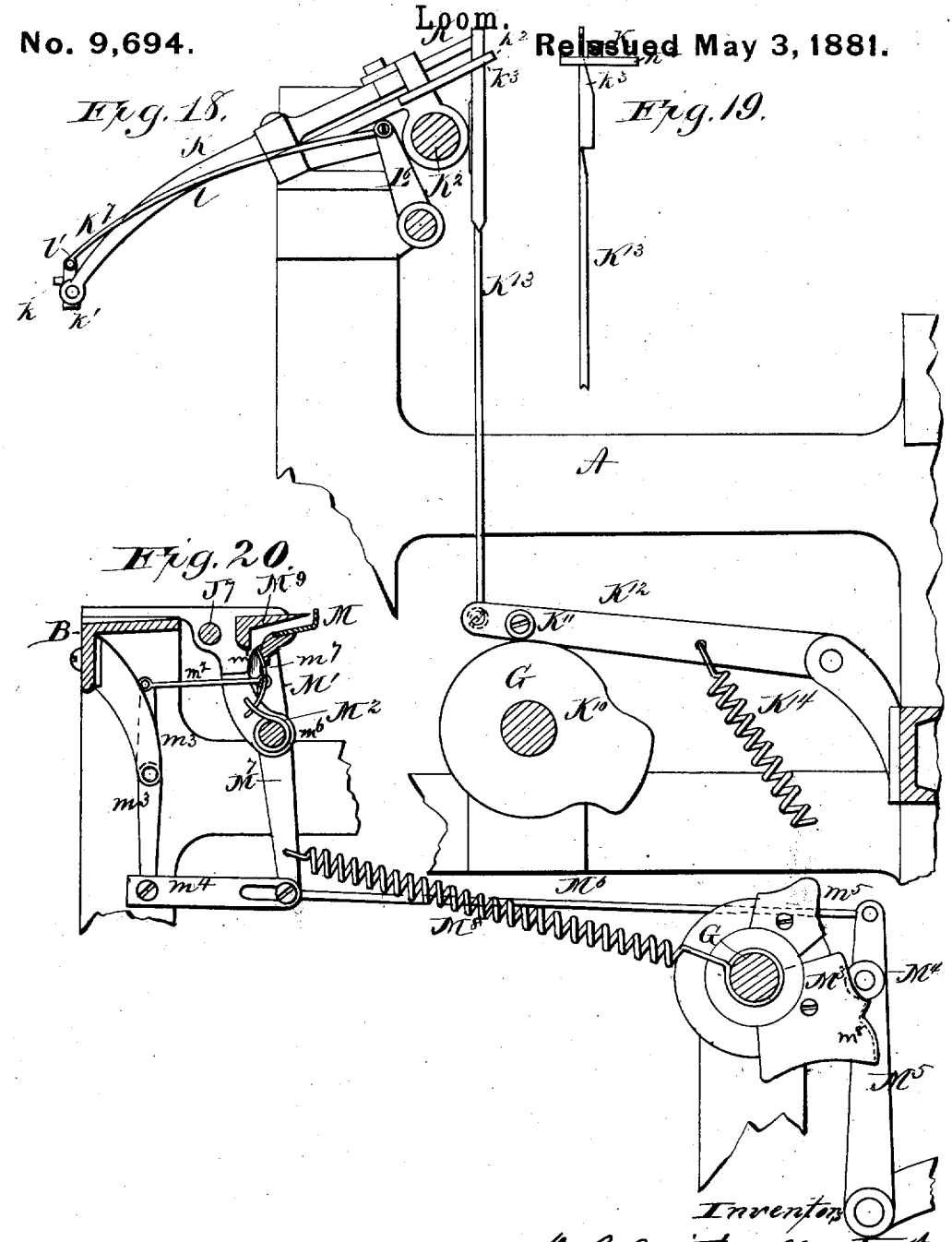
Witnesses:
F. L. Ourand
H. L. Bennett

A. SMITH, dec'd., & H. SKINNER,
W. B. SMITH & W. F. COCHRAN, executors of A. SMITH, assignors, by mesne assignments, to said W. B. SMITH, W. F. COCHRAN & E. S. COCHRAN.
Loom.
No. 9,694. Reissued May 3, 1881.
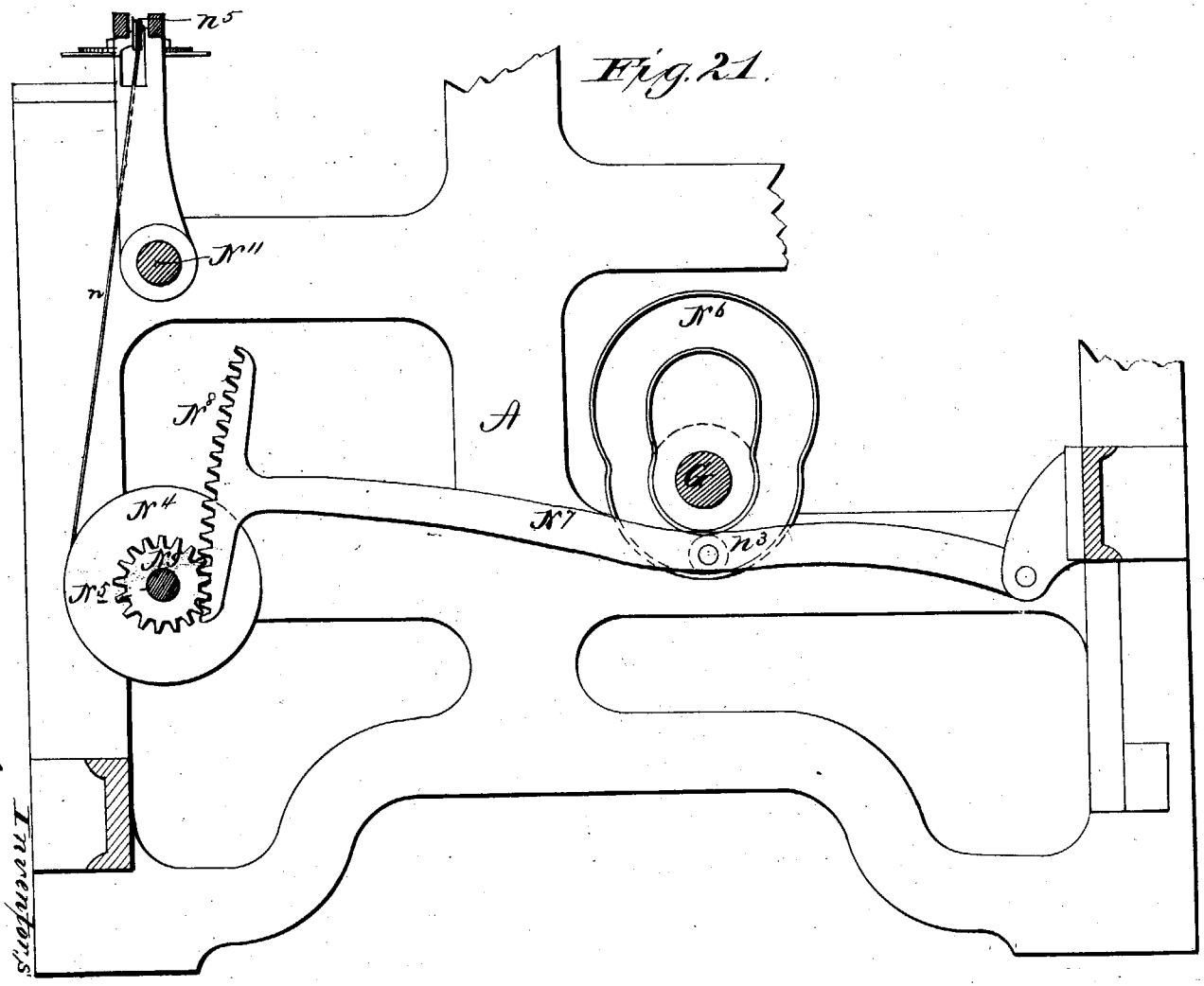
Inventors
W. B. Smith } Executors of
W. F. Cochran } Alex. Smith
Halcyon Skinner
by their atty.
E. S. Renwick
Witnesses:
Franck L. Durand
W. L. Bennett 13 Sheets—Sheet 13.

A. SMITH, dec'd., & H. SKINNER,

W. B. SMITH & W. F. COCHRAN, executors of A. SMITH, assignors, by mesne assignments, to said W. B. SMITH, W. F. COCHRAN & E. S. COCHRAN.

Loom.

No. 9,694. Reissued May 3, 1881.

Inventors

W. B. Smith } Executors of
W. F. Cochran } Aley. Smith
Halcyon Skinner
by their Atty.
E. S. Renwick Witnesses:
F. L. Ourand
H. L. Benneen

UNITED STATES PATENT OFFICE.

WARREN B. SMITH AND WILLIAM F. COCHRAN, EXECUTORS OF ALEXANDER SMITH, DECEASED, AND HALCYON SKINNER, OF YONKERS, NEW YORK, ASSIGNORS, BY MESNE ASSIGNMENTS, TO SAID WARREN B. SMITH AND WILLIAM F. COCHRAN AND EVA S. COCHRAN, ALL OF SAME PLACE.

LOOM.

SPECIFICATION forming part of Reissued Letters Patent No. 9,694, dated May 3, 1881.

Original No. 186,374, dated January 16, 1877. Application for reissue filed March 2, 1880.

*To all whom it may concern:*

Be it known that ALEXANDER SMITH, deceased, formerly of Yonkers, in the county of Westchester and State of New York, and HALCYON SKINNER, of Yonkers, aforesaid, have made an invention of certain new and useful Improvements in Looms, and that the following is a full, clear, and exact description and specification of the same.

This invention has reference more particularly to looms for weaving tufted fabrics, such, for example, as moquette goods; and its objects are to secure the tufting material more securely in the fabric and to facilitate the operations which take place in the interweaving of the threads to form the fabric.

Previous to this invention moquette or Axminster carpets had been woven in several ways.

According to one system of manufacture the tufting material in short lengths was secured in frames, one corresponding with each row of tufting material in the fabric. These frames were manipulated by hand so as to introduce the lower ends of the material by a downward movement between the warp-threads, the operation being facilitated by guides for the spool-frame. The material was secured by a shoot of filling or weft-thread introduced by means of a shuttle. The lower ends of the material were then turned upward by means of a brush operated by hand, and a second shoot of filling was introduced. In this operation the tufting material was introduced from above the position of the warp-threads. The work was, however, done by hand, and the operation was a slow one.

According to another method the tufting material was held in spool-frames extending crosswise of the fabric and fitted with needles for holding the ends of the material. A series of these spools, sufficient in number to produce the design, was carried on a large revolving drum above the position of the warp-threads. Above the warp-threads, and in the vicinity of the breast-beam, there were a pair of nipper-bars extending crosswise of the warp and capable of opening and closing, as well as of being rocked downward to and upward from the warp-threads. Each spool in succession was lowered until the ends of the tufting material were within the space between the nipper-bars, which were closed upon the said ends. The nipper-bars were then rocked down to the warp, and the spool was depressed to insert the needles between the warps. A shoot of weft-thread was passed through the loops of tufting material between the nipper-bars and the needles, after which the spool-frame was raised and the tufting material was cut by means of reciprocating knives. This mode of operation is objectionable because of the compound movement required of the nipper-bars and the difficulty of inserting the weft-thread through the loops of tufting material; hence this system has not come into use.

According to another method the tufting material was held on spools extending crosswise of the fabric in the loom, and a series of these spools, of sufficient number to produce the design, was carried by chains above the position of the warp-threads. Each spool was in succession brought near the warp-threads, and while there a series of nippers (one for each tuft) was moved upward from beneath the warp-threads so as to pass between them. The nippers were opened as they rose, were moved toward the breast-beam so as to receive the tufting material between their jaws, were closed upon the tufting material, were caused to descend with it so as to pull it downward beneath the warp-threads, were caused to move laterally, and were caused to reascend at the sides of the warp-threads opposite those at which the nippers descended, so as to place the ends of the tufting material at the upper sides of the fabric. The nippers were then opened to release the tufting material and were drawn downward so as to be out of the way of the instrument (shuttle or weft-carrier) which introduced the weft-thread or filling. This mode of operation is objectionable because of the multiplicity of operations performed and because the tufting material is secured by the warp-threads instead of by the weft or filling.

According to another mode the tufting material is carried upon spools confined in an endless series, which is introduced into the loom beneath the warp-threads, so that each spool can be brought in succession beneath the fell or cloth-making line. Each spool is fitted with as many eye-pointed needles or guides as there are tufts in a row across the fabric. Each spool in succession is raised to introduce the tufting material upward between the warp-threads, and is lowered to withdraw the needles, leaving the upper ends of the tufting material above the warp-threads, after which filling is introduced. Then the spool and its needles are raised a second time, thereby introducing loops of the tufting material between the warp-threads, and a wire carrying a knife at its point is introduced through these loops of tufting material. Subsequently the spool is lowered a second time, and the tufting material in the fabric is cut loose from the spool by withdrawing the wire, so that its knife end cuts the material. According to this mode the tufting material is secured by the weft-thread or filling; but the system is objectionable because of the introduction of the spools into the loom beneath the warp-threads, where the spools occupy space that is desirable for the mechanism of the loom; also, because it requires the manipulation of the cutting-wire, and because it also requires a number of operations not above mentioned, which, with those mentioned, occupy much time for the production of each row of tufts; hence the work, although performed by power, proceeds slowly.

The principal object of the invention which constitutes the subject of this patent is to enable moquette carpet to be woven by machinery operating to present the spools of tufting material automatically at the upper side of the warp-threads, to introduce the ends of the tufting material by a downward movement between the warp-threads, and to turn them directly upward around a weft-thread, so that the tufts are secured upon the weft-thread or filling. This mode of operation substitutes automatic mechanism for the hand-labor required for the hand-system of weaving above referred to, and greatly increases the speed of production. It also gets rid of the many movements required in one of the before-mentioned systems of power-weaving, and of the turning of the tufts around the warp-threads performed in that mode. It gets rid of the use of the wire employed in the other system of power-weaving, and it also obviates the objections incident to the presentation of the spools of tufting material at the under side of the warp-threads, and it leaves the space beneath the warp free of spools, so that said space may be advantageously used for other mechanism of the loom.

The invention consists of sundry combinations of mechanical devices, which are set forth in detail at the close of this specification.

In order that the invention may be fully understood, we have represented in the accompanying drawings, and will proceed to describe, the principal parts of a loom embodying our invention in the best form at present known to us, with the understanding that the construction and operation of the mechanical devices may be varied as circumstances or the views of different constructors or users render expedient.

The mechanism of the said loom performs the following operations, viz: The filling or weft thread is supplied at both sides of the loom, and the filling from one side is drawn through the shed by the same implement which hands through the filling from the opposite side. Filling of two grades of fineness is employed, and the finer and coarser fillings are selected automatically at both sides of the loom, according to the order in which they are to be interwoven with the warp-threads. The tufting material is carried upon spools, each mounted in a spool-frame, and each having the assortment of colored yarns upon it required for a particular one of the successive rows of tufts of which the design is formed. Each spool-frame is provided with a row of tubes for introducing the ends of the tufting material into the shed. The series of spool-frames is carried by chains, which are moved to present the spool-frames in succession to arms and their appurtenances, which take each spool-frame in its order from the carrying-chains, move it to the warp-threads, with the tufting-tubes in horizontal positions, or thereabout, rock the spool-frames so as to carry the ends of the tufting-yarns down through the warp-threads, raise the spool and spool-frame sufficiently to permit the tufting-yarns to be cut at the proper distance from the fabric to leave therein tufts of the required length, and finally restore the spool-frame and its appurtenances to the carrying-chains. The ends of the tufting material introduced beneath the warp-threads are turned upward by means of a comb, and are secured by the intervention of the filling. The cutting of the tufting material is effected by the joint operation of a fixed blade extended across the position of the fabric in the loom and a traveling circular blade, which is moved to and fro crosswise of the loom.

In order that the above operations may be effected in weaving, the loom must, of course, be provided with means for holding the warp-threads, for opening and closing the sheds, for beating up the filling, and for the other incidental operations required to weave moquette goods.

Figure 1:
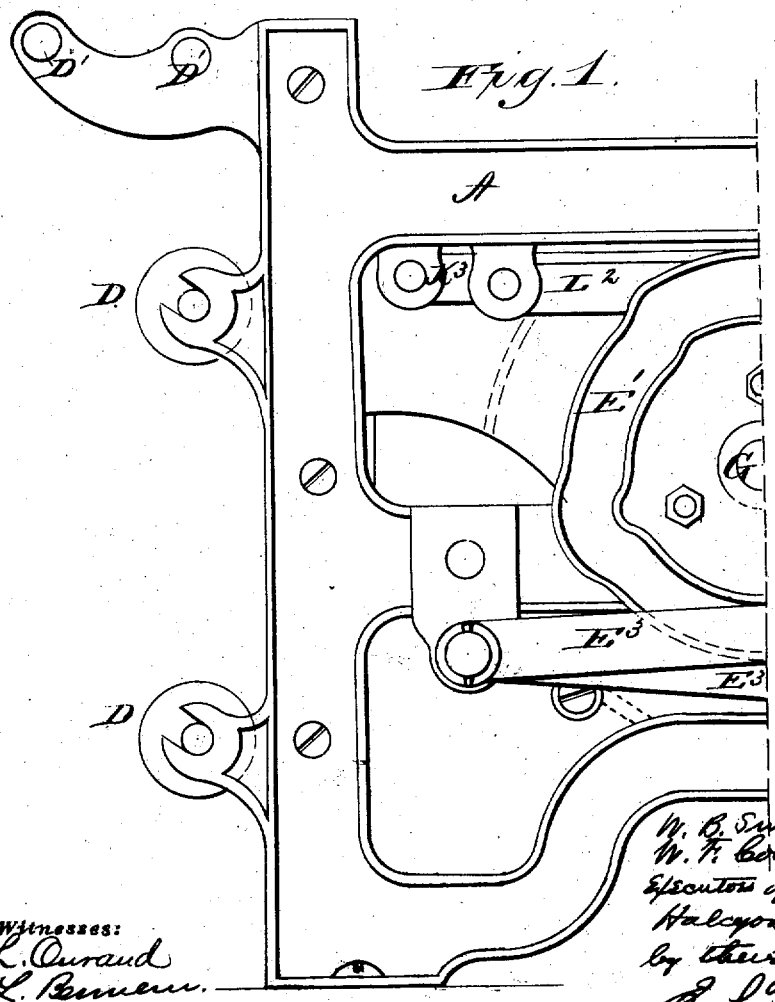
Figure 15:
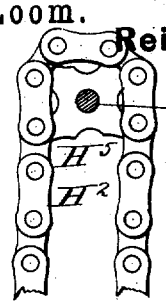
Figure 14:
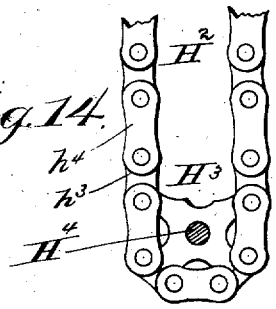
Figure 2:
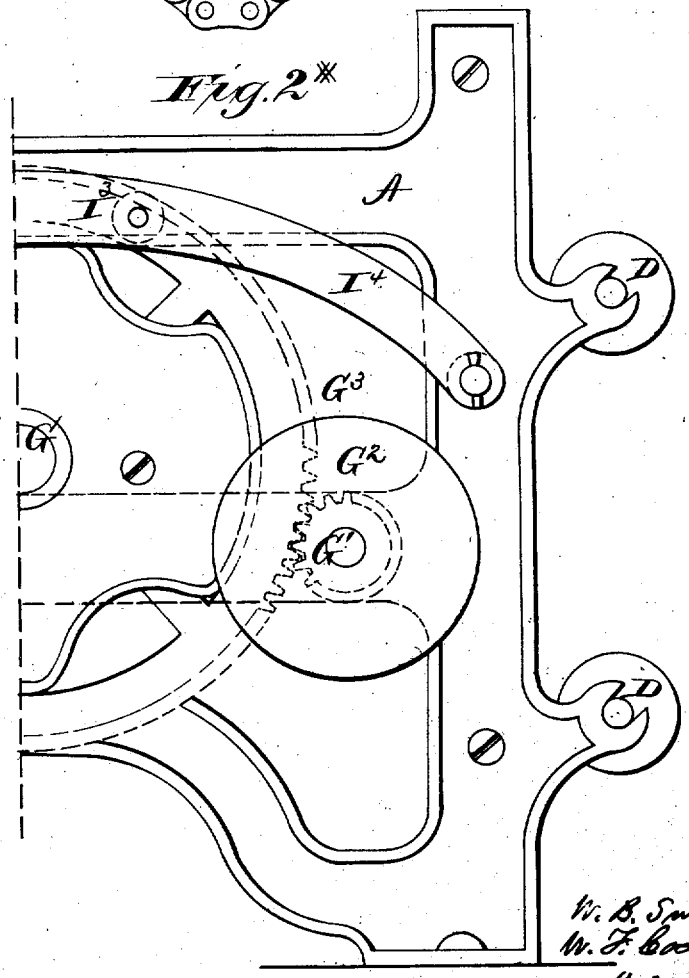
Figure 4:
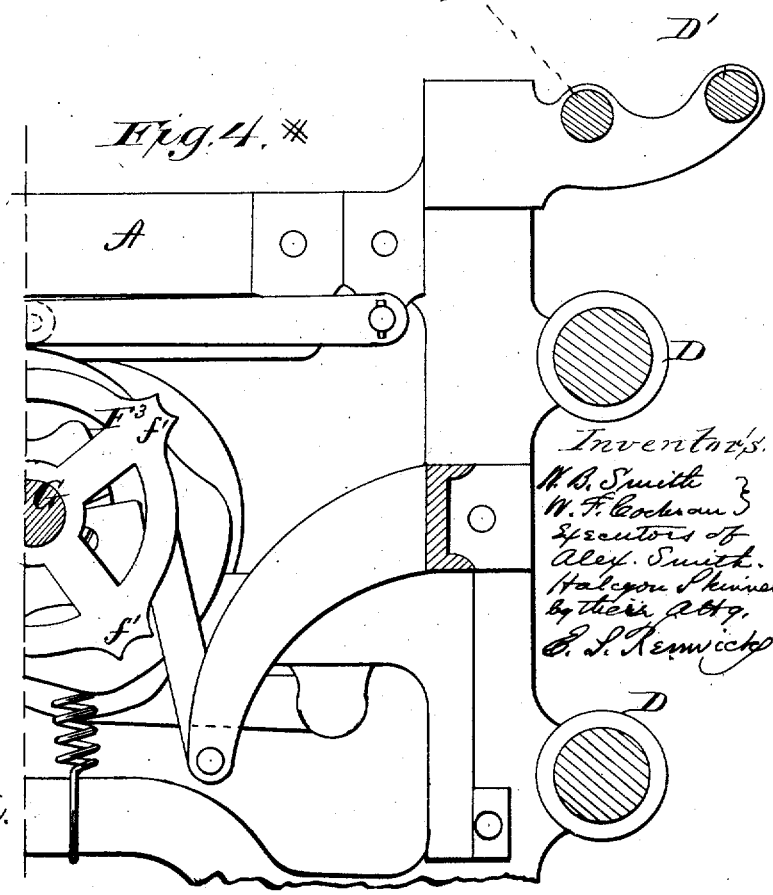
Figure 5:
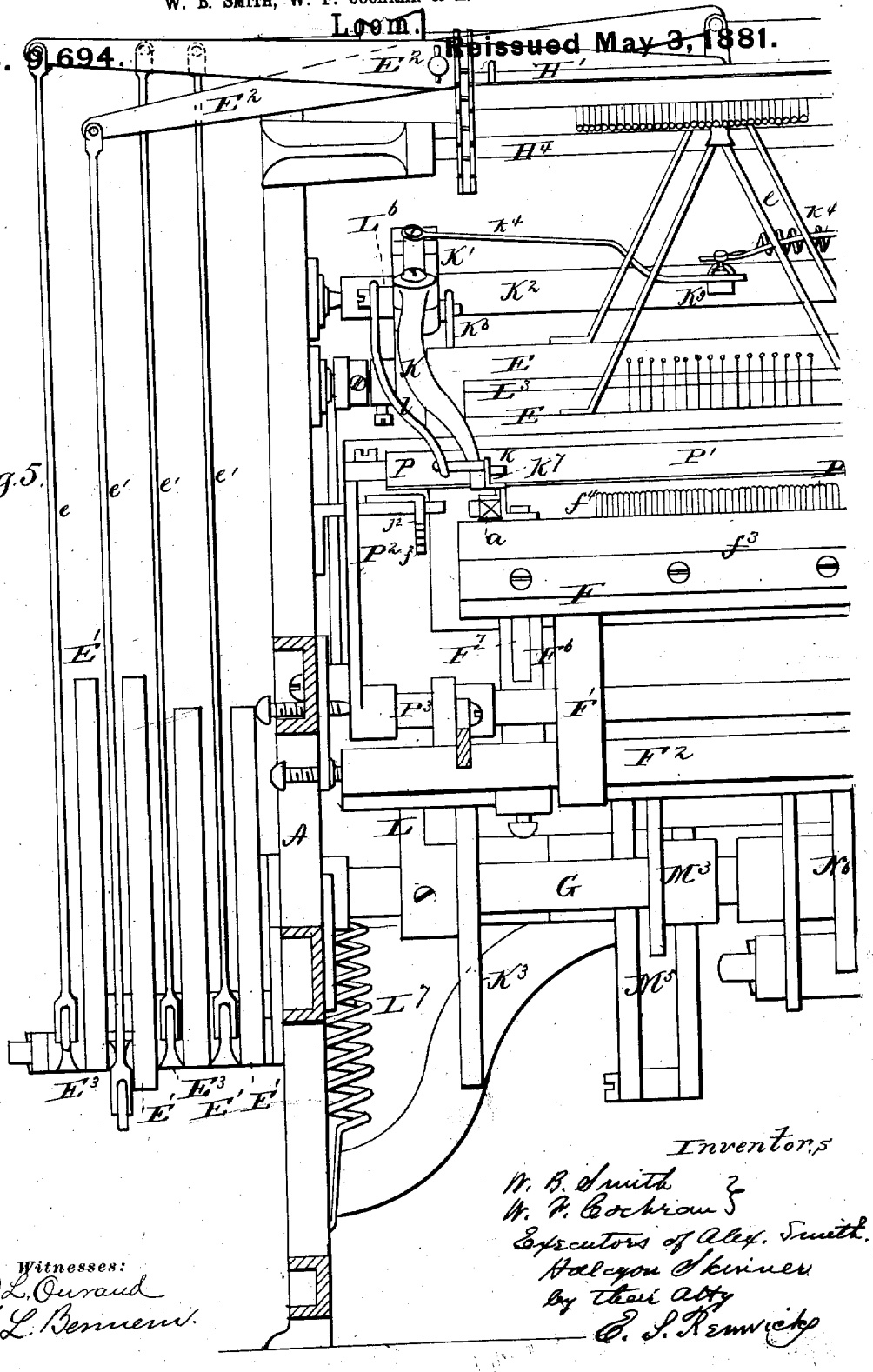
Figure 22:
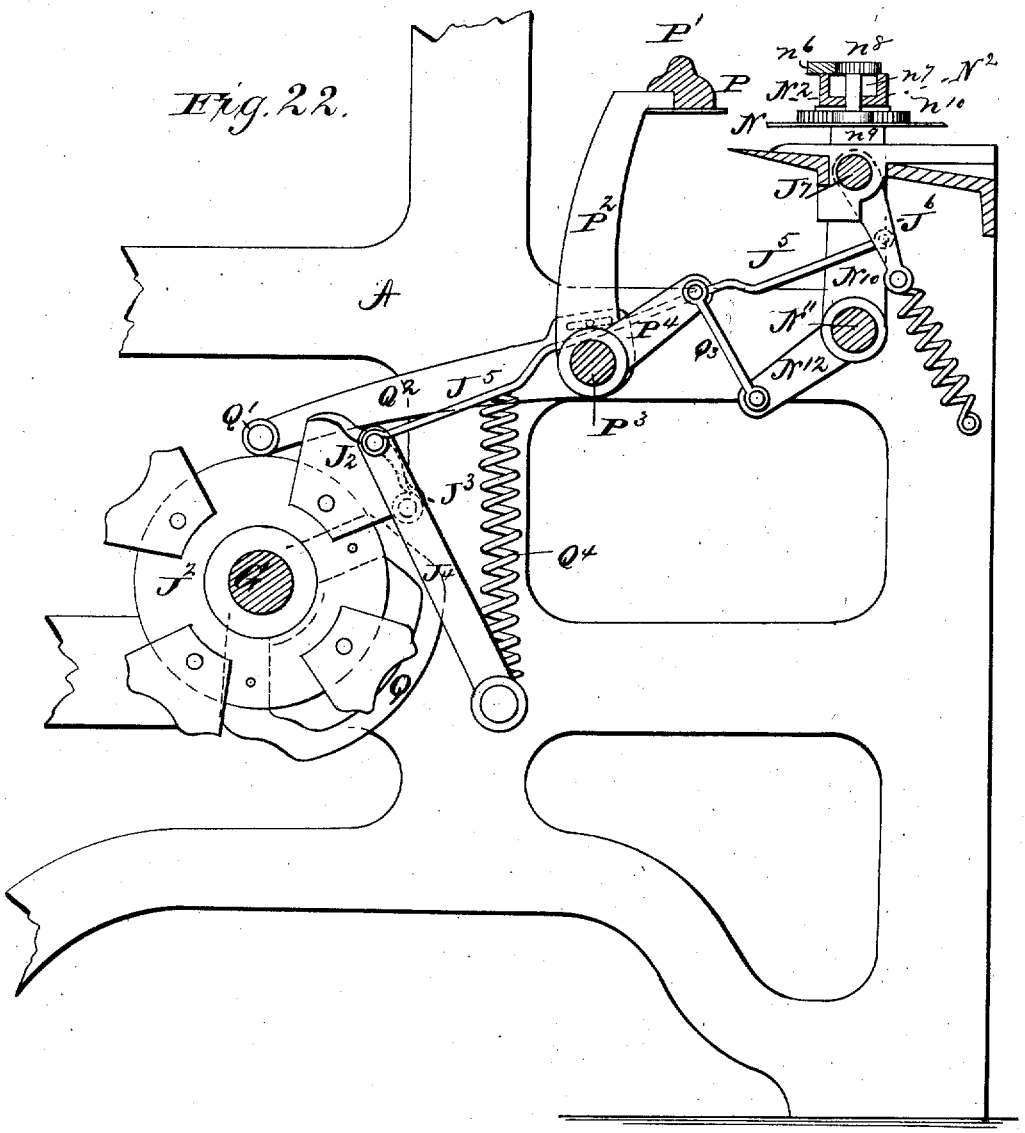

Figures 1 and 1⅜ of said drawings represent an elevation of one side of the loom. Figs. 2 and 2⅜ represent an elevation of the opposite side of the loom. Fig. 3 represents a plan of portions of the loom, designated by the same letters as they are designated by in the other figures. Figs. 4 and 4⅜ represent a central longitudinal section of the loom. Figs. 5 and 5⅜ represent a front elevation of the loom with certain parts removed. Figs. 6 to 22, inclusive, represent certain parts of the loom detached from the residue, and denoted by the same letters of reference as the same parts in the other figures.

The various moving parts of the loom are connected with a strong loom-frame, A, at the front of which is the breast-beam B and cloth-roll C, while the warp-beams D D and the rock-shafts D′ D′ of the whip-rolls are supported at its rear. The whip-rolls are not shown, as they may be constructed and supported in the usual manner.

The heddles for forming the sheds are constructed in the usual manner and are supported in frames E, which are arranged to operate in the usual manner, they being moved by means of revolving cams E′ E′ E′ E′, with which the heddle-frames are connected by means of the rods *e*, the levers $E^2$, rods *e′* and the treadles $E^3$, each of these last being fitted with a friction-wheel that runs in the groove of its respective cam. The fulcrum-stud of the heddle-levers $E^2$ is supported by an upward extension of the main frame A, which also supports the lower shaft, $H^4$, of the carrying-chains of the spools H of the tufting material. The heddle-cams E′ are secured to a cam-shaft, G, which is constructed to revolve in boxes connected with the main frame, and is driven from the driving-shaft G′ through the intervention of the cog-wheels $G^2$ $G^3$. The driving-shaft G′ is provided with belt-pulleys in the usual manner, and the customary appliances may be employed to stop the loom by transferring the belt from the fast pulley to the loose pulley upon the driving-shaft.

The filling or weft threads, when introduced as hereinafter described, are beaten up by means of a vibrating lay, F, which is supported by arms F′ F′, projecting from a rock-shaft, $F^2$. This lay is forced toward the breast-beam for the purpose of beating up the filling by means of a cam, $F^3$, which is secured to the cam-shaft G, and is caused to operate upon the lay through the intervention of the rock-shaft $F^5$, the arm $F^4$, and its friction-wheel *f*, which bears upon the cam $F^3$, the arms $F^6$, which project from the rock-shaft, and the links $F^7$, which connect the ends of the arms $F^6$ with the ears at the back of the lay.

The parts of the loom represented in the accompanying drawings are so arranged as to insert the tufting material at every fourth beat of the lay, and as the filling or weft inserted after the tufting material is finer than that used at other times, a single beat of the lay is sufficient to drive up such fine filling. For driving up the coarser filling it has been found expedient to impart to the lay a double beat; hence the lay-cam $F^3$ is constructed with three double-headed protuberances, *f′ f′ f′*, for imparting the three double beats to the lay, and with one single-headed protuberance, $f^2$, for the single beat following the insertion of the finer filling. If the lay were constructed in the usual manner, with an upper horizontal bar above the reed, it would occupy space which can be used profitably for other purposes; hence the lay is constructed without any upper bar, but with a clamp-bar, $f^3$, at its front side, between which bar and the face of the lay a series of metal loops or pins, $f^4$, are clamped to form the dents of the reed. The cam $F^3$ moves the lay forward, as required, to beat up the filling, and the backward movements of the lay are effected by a spring, $F^9$, operating upon an arm, $F^8$, of the lay rock-shaft $F^5$.

The filling to be used is wound upon bobbins or cops, which are set at opposite sides of the loom in convenient positions to permit the filling to pass to the devices which act upon it, and it is passed across the loom through the open shed by means of reciprocating weft-carrier I, which is moved to and fro at the proper times by means of the cam I′ (on the cam-shaft G) and the spring $I^2$, which acts antagonistically to the cam. The cam is caused to operate upon the weft-carrier through the intervention of the friction-wheel $I^3$, the lever $I^4$, the rod $I^5$, the elbow-lever $I^6$, the link $I^7$, and the slide-block $I^8$, to which the shank of the weft-carrier is secured. The spring $I^2$ is connected, in this example, with the lever $I^4$, and therefore operates through the intervention of that lever and its connections with the weft-carrier. The weft carrier is guided in its movements by means of the guide-bar $I^9$, upon which its slide-block $I^8$ is constructed to move, and by the guide $I^{10}$ through which the stem of the weft-carrier moves.

According to one part of the invention two loops of weft or filling (one from each side of the loom) are passed through each shed that is opened, so that both selvages are made secure, although the filling is introduced in the form of a loop. In order that the same weft-carrier may pass the filling from opposite sides of the loom, its head *i* is both forked and hooked, as seen more particularly at Figs. 6, 7, 8. The crotch of the fork *i′* engages in the loop of the filling, which is at the same side of the loom as the weft-carrier, and pushes that loop through the shed, and the bill of the hook $i^2$ engages with the filling at the opposite side of the loom, and pulls a loop of that filling back through the shed when the weft-carrier is retrograded.

The filling is held in position to be engaged by the weft-carrier by two weft-holders, J J′, one at each side of the loom, and the weft-threads or filling extending from the selvages to the bobbins of filling at the sides of the loom are held by these weft-holders in the rear of the path of movement of the head of the weft-carrier. In this loom two grades of filling (one coarse and one fine) are used, the fine filling being used after the insertion of the tufting material, so as to fasten it, and the coarse filling at other times. In order that the fine and coarse fillings may be presented to the weft-carrier in proper order the weft-holder J, at the right-hand side of the loom, is fitted with two guides, *j j*, Fig. 8, (one for each grade of filling,) which, by preference, are made in the form of eyes, and are separated by a space through which the head of the weft-carrier can traverse, and the weft-holder J′, at the left-hand side of the loom, is fitted with two guides, $j'$ $j'$, Fig. 10, which, by preference, are made in the form of hooks. Moreover, these weft-holders are moved simultaneously upward and downward by the operation of a cam, $J^2$, Fig. 22, secured to the cam-shaft G, so as to place the proper eye-guide and hook-guide in the positions to hold the filling to the weft-carrier for introduction into the same shed at the proper times. The cam $J^2$ operates upon the weft-holders J J′ through the intervention of the friction-wheel $J^3$, the vibrating lever $J^4$, the rod $J^5$, the arm $J^6$, and the rock-shaft $J^7$, with which the shanks of the weft-holders J J′ are connected. The weft-thread or filling at the left-hand side of the loom is passed through stationary eye-guides $j^2$ $j^2$, Figs. 1 and 5, before being introduced into the hook-guides of the weft-holder.

The operation of the said devices in the said loom is as follows: The weft-guides are moved upward and downward to positions above and below the line of travel of the longitudinal axis of the weft-carrier. When they are in a middle position, between the extremes of their upward and downward movements, neither weft-thread is in a position to be taken by the weft-carrier, but the two weft-threads at each side of the loom extend in straight lines from the corresponding corners of the fell of the fabric to the eyes and hooks of their respective guides, the upper weft-thread at each side of the loom being then above the horizontal line of travel of the head of the weft-carrier, and the lower weft-thread being then below that line of travel. When the upper weft-thread at the right-hand side of the loom is to be taken across the shed of warp-threads the weft-guides are depressed by their cam before the weft-carrier begins to move, or at about that time. The effect of such depression is to bend the upper weft-thread, extending between the fell and the weft-guide, downward across the shank of the hook $i^2$, Fig. 8, within the range of motion of the crotch $i'$, so that when the weft-carrier moves forward its crotch comes in contact with the bent weft-thread and pushes it through the shed to the left-hand side of the loom. After the weft-carrier commences to move forward the weft-guides are restored to their middle positions by the action of their cam $J^2$. When the lower left-hand weft-thread is to be taken by the return movement of the weft-carrier the weft-guides are raised from their middle position after the weft-carrier reaches its most outward position and before it commences to return, or thereabout. By this rise the lower left-hand weft-thread is bent upward between the corner of the fell and the appropriate fixed guide $j^2$ and across the shank of the hook $i^2$, and as the hook-guide J′ (whose rise produces this upward bend) operates between the line of travel of the weft-carrier and the fell of the fabric the weft-thread so bent is within the range of the hook $i^2$ of the weft-carrier in its return movement, and is drawn by it through the shed. After the hook of the weft-carrier has safely seized the left-hand weft-thread the weft-guides are restored to their middle positions. When the lower right-hand weft-thread or the upper left-hand weft-thread is to be taken the motions of the weft-guides from their middle positions are reversed, the right-hand weft-guides being raised before the weft-carrier starts to cross the shed, or thereabout, and the left-hand weft-guides being depressed before the return movement, or thereabout.

The construction of the reciprocating weft-holder with two guides enables one weft-thread to be guided to the position for engagement with the weft-carrier, and the other weft-thread to be guided out of the position for engagement by a single movement of one weft-holder, and is therefore advantageous.

In order that the loop of weft-thread or filling introduced by the weft-carrier while moving in one direction across the shed may not move back with the said carrier when it moves in the opposite direction a spring weft-finger, $a$, Figs. 1⅜, 5, 5⅜, and 11, is provided at each end of the lay to enter and hold the end of the loop. The spring appertaining to this weft-finger permits it to yield crosswise of the loom in the direction which the weft-carrier is traveling as the head of the weft-carrier passes by it, and then causes the weft-finger to move back and engage in the loop. When the lay retrogrades, after having beaten up the filling, the weft-fingers are withdrawn from the loops.

In order that the tufting material may be introduced into the fabric it is wound upon the spools H, of a length sufficient to hold the yarn required to form a row of tufts across the fabric, the material for each tuft being wound on the spool in a belt or zone. Each spool is fitted to turn upon journals, which are held in a spool-frame, H′, (represented more fully in Figs. 12 and 13,) and the longitudinal bar $h$ of this spool-frame is fitted with as many short tubes or nozzles $h'$ as there are tufts in a row across the fabric. When the spools are prepared for use the ends of the tufting material are passed from the spool through the tubes, and are permitted to protrude sufficiently therefrom—say one inch—to be engaged in the warp of the fabric. As many spools are used as there are to be rows of tufts in the pattern before the same is repeated. In order that these spools may be held and presented in succession to the mechanism which takes them and introduces the ends of the tufting-yarns between the warp-threads two parallel endless chains, $H^2$, are provided, and are constructed to hold the series of spools above the position of the warp-threads extending through the dents of the lay F, and over the breast-beam B, so that the tufting material may be introduced into the fabric from above the positions of the warp-threads. These chains pass round sprocket-wheels $H^3$, Fig. 14, secured to a shaft, $H^4$, Fig. 5, that is supported by the frame of the loom. The chains are long enough to hold a number of spool-frames corresponding with the number of rows of tufts required to form the design before repetition, and the chains are supported upon a pair of sprocket-wheels, $H^5$, Fig. 15, secured to a second shaft, $H^6$, which is at the requisite distance from the first sprocket-wheel shaft $H^4$ to hold the chains extended.

Figure 12:
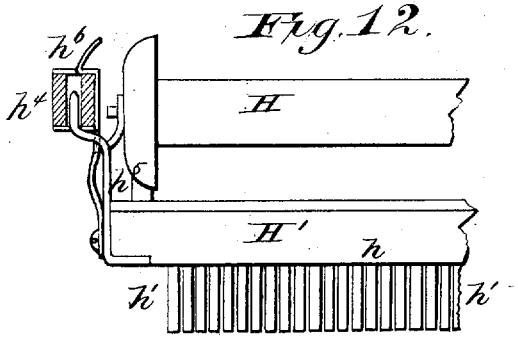
Figure 13:
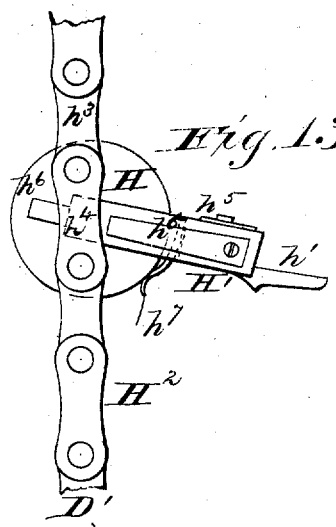

In order that each spool-frame may be readily connected with and disconnected from the carrying-chains, each chain is formed of single links $h^3$ and double links $h^4$ in alternate succession, and the ends $h^5$, Figs. 12 and 13, of the spool-frames are fitted to engage in the slots between the members of the double links. Moreover, each end of each spool-frame is provided with a spring-catch, $h^6$, Figs. 12 and 13, whose inclined head, when pressed against the outer edge of the inner member of the double link, yields, passes by the inner side of the link, and engages with its inner edge, so as to hold the spool-frame to the chain. The shanks of these spring-catches $h^6$ are passed through slots in the ends of the spool-frames to their outer sides, where they are in convenient positions to be forced inward for the purpose of disengaging the heads of the catches from the chains, and thereby releasing the spool-frames. Each spool-frame is fitted with a spring-brake, $h^7$, which bears upon the rim of one of the spool-heads, and prevents the spool from turning, unless the tufting material is drawn from it.

In order that the spools may be transferred in succession to the place where the tufts are to be introduced, the lower sprocket-wheel shaft, $H^4$, is turned intermittingly, so as to place each spool-frame in succession at its lowest position, and the chains then remain at rest, while the spool-frame is taken from them, is transferred to the place of weaving, and then restored to the chains by the spool-transferring mechanism. The chains are then moved to bring the next succeeding spool-frame into its lowest position.

The mechanism for turning the lower sprocket-wheel shaft $H^4$ intermittingly may consist of a ratchet-wheel secured to the sprocket-wheel shaft, of a hook to operate on the ratchet-teeth in succession, so as to pull them round, and of a cam and treadle to move that hook, the cam being secured to the cam-shaft G. A pawl also may be provided to prevent retrograde movement when the hook is retrograding. As the construction of such mechanism is well understood by loom-builders it is not represented in the drawings.

In order that the spool-frames may be taken from the carrying-chains, two transferring-arms, K K, are provided, each being connected with an arm, K′, projecting from a rock-shaft, $K^2$. The transferring-arms, as represented in detail in Figs. 16, 17, 18, and 19, are pivoted to the rock-shaft arms K′, so that the outer ends of the former may be moved horizontally toward and from each other, and their rear ends are inserted into guide-slots at the hubs of the rock-shaft arms K′, so that the transferring-arms are prevented from wabbling relatively to the rock-shaft arms K′ in vertical directions. The transferring-arms are caused to vibrate at the time when the spool-frame is to be taken from the carrying-chains and transferred by a downward movement to its position for delivering tufting material to the fabric being woven, and when the spool-frame is to be returned to the carrying-chains, by means of a cam, $K^3$, (see Fig. 16,) secured to the cam-shaft G. This cam is constructed to operate upon the rock-shaft $K^2$ of the transferring-arms through the intervention of the friction-wheel $K^4$, lever $K^5$, and rod $K^6$, this rod being connected at its upper end with one of the rock-shaft arms K′. The cam raises the transferring-arms and permits them to descend.

In order that the transferring-arms may grasp and hold the spool-frame, the outer end of each transferring-arm is fitted with a clutch, $K^7$, having three horns or projections, $k\,k\,k'$, (see Figs. 16 and 17,) the first two, $k\,k$, being separated by a space sufficient to admit the end of the spool-frame easily between them. The third horn, $k'$, is arranged so as to pass beneath the end of the spool-frames. All these horns should be made flaring at their inner sides, so as to enable them to be readily applied to the ends of the spool-frames. In order that these clutches may be made to grasp the spool-frame and to release it as required in the operation of the loom, the inner ends of the transferring-arms K are connected by rods with the opposite ends of an intermediate lever, $K^9$, which is pivoted to the transfer rock-shaft $K^2$. One end of this lever $K^9$ is connected with a spring, $K^{10}$, which tends to move the clutches inward, so that they grasp the spool-frame between them. The clutches are moved outward to release the spool-frame, and are permitted to move inward to grasp it at the proper times in the operation of the loom, by means of a cam, $K^{10}$, secured to the cam-shaft G. (See Fig. 18.) This clutch-cam operates upon the rear end of one of the vibrating-arms K, through the intervention of the friction-wheel $K^{11}$, lever $K^{12}$, rod $K^{13}$, and wedge $k^3$, the wedge entering between the end of the vibrating arm and a guide, $k^2$, secured to the hub of the rock-shaft arm K′. The cam $K^{10}$ moves the wedge $k^3$ in one direction, and permits it to be moved in the reverse direction by a spring, $K^{14}$. The motion is imparted from one of the vibrating arms to the other by means of the rods $k^4$ and intermediate lever, $K^9$.

According to one part of the invention the spool-frames are presented to the warps with their tubes in horizontal positions, and are then rocked so as to turn the ends of the tufting material down between the warp-threads.

In order that the spool-frames may be so presented and rocked each clutch $K^7$ is combined with the end of its respective transferring-arm by a pivot, which permits it to be rocked, and in order that the clutches may be rocked at proper times, as required in the operation of the loom, a cam, L, Figs. 5 and 16, is secured to the cam-shaft G, and is connected with the clutches through the intervention of the friction-wheel $L'$, the arm $L^2$, the rod $L^5$, the clutch rock-shaft $L^3$, and its arms $L^4$ $L^6$, and the rods $l$ $l$, these last being connected, by pivots $l'$ $l'$ with the clutches. The clutch-cam L rocks the clutches in one direction, and permits them to be rocked in the reverse direction by a spring, $L^7$, which is connected with the arm $L^2$. The rocking-cam L is so formed and set relatively to the transfer-cam $K^3$ (which moves the transferring-arms K from and to the carrying-chains) that when the spool-frame is brought to the warps its tubes are horizontal, or thereabout, and that these are turned downward and forward through the warps by the rocking of the spool-frame by the action of the rocking-cam on the clutches.

In practice it is convenient to take the spool-frame from the carrying-chains when the spool-frame is hanging vertically, or thereabout, from the lowest link of the chains; hence the rocking-cam L is so formed as to rock the clutches $K^7$ during the downward movement of the transferring-arms, and to thereby place the tubes in horizontal positions by the time the spool-frame reaches the warp-threads. At this point the spool-frame is rocked into a vertical position, thereby inserting the threads between the warps. After the ends of the tufting material have been introduced between the warp-threads by the rocking of the spool-frame, as above described, a shot of fine filling is introduced into the shed to secure or fasten the ends of the tufting material. Then the ends are turned backward, or away from the breast-beam, and upward previous to the introduction of the next shot of coarse filling. The turning of the ends of the tufting material backward is effected by a reciprocating comb, M, Figs. 1⅜, 2, 20, which is constructed to reciprocate horizontally, or thereabout, between the breast-beam and the lay of the loom and beneath the position of the warp-threads. This comb is connected, by arms $M'$, with the comb rock-shaft $M^2$, and its movements are controlled by an internal cam, $M^3$, Figs. 5 and 20, secured to the cam-shaft G, the said cam having a laterally-projecting rim or flange, (represented in dotted lines at $m^8$, Fig. 20,) whose inner side operates on the friction-wheel $M^4$ of the cam-lever $M^5$. The cam, Fig. 20, acts upon the comb through the intervention of the friction-wheel $M^4$, the lever $M^5$, the rod $M^6$, the rock-shaft $M^2$, and its arms $M^7$ $M'$. The cam, drawing the lever $M^5$ forward, moves the rod $M^6$ and the lower end of the arm $M^7$ forward, thereby rocking the rock-shaft $M^2$ and moving the comb backward in the loom. The cam $M^3$, also, in its revolution, permits the comb to be moved forward in the loom by the action of a spring, $M^8$, which is connected with the arm $M^7$. When the comb moves backward it is expedient that it should be pressed upward with a yielding pressure, so that it may turn the ends of the tufting material upward, and when the comb is moved forward it is expedient that it should be depressed, so that its teeth may clear the fabric. In order that the comb may be pressed upward, and also depressed, it is not connected rigidly with the rock-shaft arms $M'$, but is connected with them at its ends by pivots $m$, Fig. 2, so that the comb-teeth may be depressed and raised by rocking the comb on these pivots It is convenient to effect the depression of the comb by the same cam, $M^3$, which moves it backward, and to this end the comb-stock is connected, by an arm, $m'$, link $m^2$, and lever $m^3$, with the extended extremity $m^4$ of the rod $M^6$, through the intervention of which the comb M is operated. This rod $M^6$ has a slot in it for the pin of the arm $M^7$, so that when the rod $M^6$ is drawn back by the comb-cam $M^3$ (for the purpose of depressing the comb) its slot moves upon the pin of the arm $M^7$ and does not move the comb forward. The comb-cam is fitted with a supplementary grade or projection, $m^5$, Fig. 20, to operate the rod $M^6$ when the comb is to be depressed. The comb is pressed upward with a yielding pressure by means of a spring, $m^6$, which operates upon the comb-stock through the intervention of the arm $m'$, secured thereto. This spring tends to move the comb upward whenever it is permitted to do so by the comb-cam $M^3$; consequently, after the comb has been moved forward in the loom, the turning of the cam permits the comb to rise and resume its upper position and to be pressed upward by the spring during its backward movement. The stock of the comb is covered by a guard-plate, $M^9$, over which the fabric passes to the breast-beam, and the rear edge of the guard-plate acts as a stop to limit the forward movement of the comb.

After the ends of the tufting material have been moved backward and turned upward by the operation of the comb, a shot of coarse filling is inserted by the operation of the weft-carrier I. Then the spool-frame is raised sufficiently to permit the tufting material to be cut between the ends of the tubes and the fabric, so as to leave the row of tufts in the fabric and the tufting material protruding sufficiently from the tubes to be in position for being inserted between the warp-threads the next time that same spool-frame is brought into use in producing the design. This partial raising of the spool-frame is effected by the action of the transfer-cam $K^3$, which moves the transferring-arms, and after such raising the transferring-arms and spool-frame remain at rest, by reason of the form of the transfer-cam, until the tufting material is cut.

The cutting of the tufting material is effected, according to certain parts of the invention, by the action of a disk-cutter, N, Figs. 1⅜, 2, 3, 4, 21, and 22, which is caused to reciprocate across the loom, and to turn on its central axis as it moves along. This disk-cutter operates in connection with a fixed blade, P, which is, by preference, formed with a cutting-edge, so as to cut as well as support the tufting material for the action of the disk-cutter. The disk-cutter N is pivoted to a carriage, N′, which is constructed to slide crosswise of the loom upon the two slide-bars $N^2$ $N^2$. The opposite ends of this carriage are connected, by cords $n$ $n'$, with two pulleys, $N^3$ $N^4$, secured to a shaft, $N^5$, which is caused to turn alternately in opposite directions and at proper times by the cam $N^6$, Figs. 5 and 21, secured to the cam-shaft G. This cutting-cam $N^6$ is connected with the cutter-shaft $N^5$ through the intervention of the friction-wheel $n^3$, the lever $N^7$, the cog-segment $N^8$, and the pinion $N^9$. The carriage-cords pass over pulley-sheaves $n^4$ $n^5$ at opposite sides of the loom, are wound in opposite directions upon their respective pulleys $N^3$ $N^4$, and are secured thereto; hence the turning of the cutter-shaft in one direction by the cutter-cam lets out one cord and winds up the other, so as to move the disk-cutter in one direction across the loom, and the turning of the cutter-shaft in the opposite direction reverses these movements and moves the cutter in the opposite direction across the loom. The disk-cutter is caused to turn upon its axis while it is moved crosswise of the loom, and is operating in combination with the fixed blade.

The mechanism which it is preferred to use for the purpose of compelling the disk-cutter to turn upon its axis or revolve is the following: A cog-rack, $n^6$, is secured to one of the bars $N^2$, and an upright shaft, $n^7$, is constructed to turn in bearings in the cutter-carriage. The upper end of this upright shaft is fitted with a pinion, $n^8$, whose teeth are engaged with those of the rack $n^6$, and the lower end of the same shaft is fitted with a cog-wheel, $n^9$, whose teeth are engaged with those of a second cog-wheel, $n^{10}$, which is connected rigidly with the disk-cutter N; hence, when the cutter carriage is moved across the loom, its shaft $n^7$ is compelled to revolve by the action of the rack $n^6$ upon the pinion $n^8$, and the revolving movement is imparted to the disk-cutter through the intervention of the cog-wheels $n^9$ $n^{10}$, which connect the disk-cutter with the carriage-shaft $n^7$.

In order that the disk-cutter and fixed blade may be moved out of the way of the spool-frame at the time it is moved to the warp, and may be brought into the proper positions for cutting after the spool-frame has been moved back sufficiently for that purpose, the fixed blade and the disk-cutter are so connected with the loom-frame as to have a reciprocating movement toward and from each other. For this purpose the stock P′ of the fixed blade P is connected, by arms $P^2$, with rock-shaft, $P^3$, and the slide-bars $N^2$ of the disk-cutter carriage are connected, by arms $N^{10}$, with a second rock-shaft, $N^{11}$, so that by rocking the said rock-shafts $P^3$ $N^{11}$, the two cutting implements may be moved toward and from the position where the tufting material is to be cut, which position is intermediate between the positions of the two cutting implements when they are farthest apart. The rocking of the shafts $P^3$ $N^{11}$ is effected at the proper times by the action of a cam, Q, Fig. 22, secured to the cam-shaft G. This cam operates upon the rock-shaft $P^3$ of the fixed blade P, through the intervention of the friction-wheel Q′ and arm $Q^2$, and the movement is transmitted to the second rock-shaft, $N^{11}$, through the intervention of the rock-shaft arms $P^4$, $N^{12}$, and a link, $Q^3$. Two sets of these rock-shaft arms and links are used, (one set at each side of the loom,) in order that the cutters may be held together while the disk-cutter is passing from one side of the fabric to the other during the cutting of the row of tufts. The cutter-cam Q moves the cutters toward each other, and permits them to be moved apart by the operation of a spring, $Q^4$.

The arm $Q^2$, which imparts motion from the cam Q to the first rock-shaft, $P^3$, is made adjustable, so as to enable the cutters to be set to operate as required. When both cutters have cutting-edges, it was found expedient at the date of the application for the original patent to so arrange the cutters relatively to each other that the edge of the disk-cutter is under that of the fixed cutter.

The cutter-cam $N^6$, for traversing the circular cutter N, is of such form that the disk-cutter is moved crosswise to the left-hand side of the loom while the cutters are separated, and is moved crosswise back again for cutting while the cutters are held together by the action of the cam Q.

After the tufts are cut loose from the spool-frame the latter is restored to its position in the carrying-chains by the upward movement of the transferring-arms K by the action of the transfer-cam $K^3$. Then the clutches $K^7$ are drawn apart by the action of the cam $K^{10}$, so as to release the catches $h^6$ of the spool-frame, and permit them to secure the spool-frame to the carrying-chains. The separation of the clutches is continued sufficiently to cause them to stand clear of the spool-frames, and the clutches are held thus separated until the carrying-chains have been moved sufficiently to remove the spool frame that was last used from the range of movement of the clutches, and to bring the next succeeding spool-frame of the series within that range, so that it may be taken from the carrying-chains by the transferring mechanism, as required in the operation of the loom.

In the weaving of tufted fabrics by the loom, parts of which are represented in the accompanying drawings, it was deemed expedient to introduce the tufting material at every fourth shot of the filling. Consequently the cams of the loom are so formed and arranged as to operate in this manner, and to interweave three double shots of coarse filling with the warp-threads for each double shot of fine filling. This plan of weaving may be changed, if deemed expedient, by modifying the cams as required.

The forms of the various devices which have been described, and the manner of moving them, may be greatly varied without changing substantially their mode of operation. Thus, for example, the transferring-arms may be adapted to move in straight lines instead of vibrating through the arc of a circle. The forms of the rocking-clutches and of the spool frames may also be greatly varied, and the described mechanism for causing the circular cutter to revolve may be replaced by any other known equivalent mechanism or changed in details without affecting its principle of operation. It is deemed preferable that the edge of the circular cutter should lap under that of the fixed blade; but this arrangement may be reversed if deemed best. It is also preferred to make both blades with sharp or cutting edges; but, if deemed best, one of them only may have a sharp edge while the other presents a flat bearing against one side of the tufting material, so as to sustain it while the other edge does the cutting.

In the loom above described cams are used for imparting the various movements to the members of the loom, with springs acting antagonistically to the cams, because these devices are believed to be those best adapted to convert the rotary motion of the revolving shaft of a loom into the peculiar reciprocating motions which are to be imparted to the operating members; but other devices may be substituted for the cams and springs.

In the loom above described chains are used to carry the spool-frames; but other equivalent means may be employed to move them in succession to and from the position in which they are taken by the clutches. So, also, the transmitting devices for transmitting the motions from the cams or their substitutes to the various parts of the loom may be changed, as found expedient, to suit the views of different constructors or users.

The foregoing description describes that the spool-frames are detached from the chains when they are moved to the position for having the ends of the tufting material inserted in the fabric; but this detachment of the spool-frame from its carrier is not of the essence to this part of the invention, which primarily required only such an arrangement of the spool-frame to be used that it may be moved downward to the warps to insert the tufting material and swung or moved back to the position from which it was diverted after the tufts have been cut loose from the material on the spool.

Instead of inserting the weft or filling from both sides of the loom in the same shed, the weft from the opposite sides of the loom may be inserted alternately in successive sheds. This modification in the operation requires no change in the mechanism, except that the respective weft-guides at the opposite sides of the loom must then be separated and moved alternately, so that only the one or the other will be advanced during a beat of the loom to present its weft or filling for engagement by the weft-carrier.

We claim as the invention of ALEXANDER SMITH, deceased, and HALCYON SKINNER—

1. The combination, substantially as before set forth, of the movable weft-holders at the two sides of the loom, and the weft-carrier, constructed with a head which is both forked and hooked, whereby the fillings selected at the opposite sides of the loom are both introduced into the sheds by the same weft-carrier.

2. The combination, substantially as before set forth, of the weft-carrier, with a reciprocating weft-holder provided with two guides separated by a space for the passage of the weft-carrier.

3. The combination, substantially as before set forth, of the weft-carrier and the yielding spring weft-finger, constructed to yield in the direction in which the weft-carrier moves, whereby the loop of filling is introduced into the shed, is engaged at the side thereof, and is held in the shed during the reverse movement of the weft-carrier.

4. The combination, substantially as before set forth, of the weft-carrier, constructed with a head which is both forked and hooked and two yielding spring weft-fingers, one at each side of the loom, and constructed to move in the direction in which the weft-carrier moves, whereby loops of filling selected at either side of the loom are engaged at the opposite side thereof, and are held in the shed.

5. The combination, substantially as before set forth, of the lay fitted with loops, (without an upper cross-bar,) the transferring arms, and the series of spool-frames arranged above the position of the warp-threads passed through the loops of the lay.

6. The combination, substantially as before set forth, of the lay, the series of spool-frames arranged above the position of the warp-threads passed through the dents of the lay, and the comb, which is arranged beneath the said position and which turns the ends of the tufting material upward around the filling or weft-thread.

7. The combination, substantially as before set forth, of the lay, the series of spool-frames arranged above the position of the warp-threads passed through the dents of said lay, the comb which turns the ends of the tufting material upward around the filling or weft-thread, and the cutter for cutting the tufts free of the spool.

8. The combination, substantially as before set forth, of the disk-cutter and the fixed cutter-blade with the cam mechanism, whereby they are moved toward and from the intermediate position at which the tufting material is cut.

9. The combination, substantially as before set forth, of the disk-cutter, the fixed cutter-blade, the cam mechanism for causing the said two cutters to move to and from the intermediate position at which cutting is effected, the cam mechanism for moving the disk-cutter crosswise of the loom, and the means for causing the disk-cutter to revolve during its crosswise movement.

10. The combination, substantially as before set forth, of the transferring-arms and the rocking-clutches for rocking the spool-frame.

11. The combination, substantially as before set forth, of the carrying-chains, the transferring-arms, and the rocking-clutches.

12. The combination, substantially as before set forth, of the comb and the cam mechanism for causing the comb to move horizontally and vertically.

In witness whereof we have hereto set our hands this 2d day of December, A. D. 1879.

WARREN B. SMITH,
WM. F. COCHRAN,
*Executors of estate of Alex. Smith.*
HALCYON SKINNER.

Witnesses:
WM. T. FITCH,
JOHN A. DOWE.